US 11,402,846 B2

(12) United States Patent
Katsif et al.

(10) Patent No.: US 11,402,846 B2
(45) Date of Patent: Aug. 2, 2022

(54) METHOD, SYSTEM AND APPARATUS FOR MITIGATING DATA CAPTURE LIGHT LEAKAGE

(71) Applicant: ZEBRA TECHNOLOGIES CORPORATION, Lincolnshire, IL (US)

(72) Inventors: Dmitri Katsif, Vaughan (CA); Sadegh Tajeddin, Mississauga (CA); Harsoveet Singh, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 91 days.

(21) Appl. No.: 16/430,096

(22) Filed: Jun. 3, 2019

(65) Prior Publication Data
US 2020/0379477 A1 Dec. 3, 2020

(51) Int. Cl.
*G05D 1/02* (2020.01)
*G05D 1/00* (2006.01)
*H04N 5/232* (2006.01)

(52) U.S. Cl.
CPC ......... *G05D 1/0246* (2013.01); *G05D 1/0094* (2013.01); *G05D 1/0238* (2013.01); *H04N 5/23299* (2018.08); *G05D 2201/0207* (2013.01)

(58) Field of Classification Search
CPC .. G05D 1/0246; G05D 1/0238; G05D 1/0094; G05D 2201/0207; G05D 1/0212;
(Continued)

(56) References Cited

U.S. PATENT DOCUMENTS

| 5,209,712 A | 5/1993 | Ferri |
| 5,214,615 A | 5/1993 | Bauer |

(Continued)

FOREIGN PATENT DOCUMENTS

| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.
(Continued)

*Primary Examiner* — Rodney A Butler

(57) ABSTRACT

A mobile automation apparatus includes: a chassis supporting a locomotive assembly and an illumination assembly configured to emit light over a field of illumination (FOI); a navigational controller connected to the locomotive assembly and the illumination assembly, the navigational controller configured to: obtain a task definition identifying a region in a facility; generate a data capture path traversing the region from an origin location to a destination location, the data capture path including: (i) an entry segment beginning at the origin location and defining a direction of travel angled away from a support structure in the region such that a lagging edge of the FOI intersects with the support structure; and (ii) an exit segment defining a direction of travel angled towards the support structure and terminating at the destination location such that a leading edge of the FOI intersects with the support structure.

19 Claims, 10 Drawing Sheets

(58) Field of Classification Search
CPC ............. G05D 1/0248; H04N 5/23299; H04N 5/2252; H04N 5/228; H04N 5/247
See application file for complete search history.

(56) References Cited

U.S. PATENT DOCUMENTS

| | | | |
|---|---|---|---|
| 5,408,322 A | 4/1995 | Hsu et al. | |
| 5,414,268 A | 5/1995 | McGee | |
| 5,423,617 A | 6/1995 | Marsh et al. | |
| 5,534,762 A | 7/1996 | Kim | |
| 5,566,280 A | 10/1996 | Fukui et al. | |
| 5,704,049 A | 12/1997 | Briechle | |
| 5,953,055 A | 9/1999 | Huang et al. | |
| 5,988,862 A | 11/1999 | Kacyra et al. | |
| 6,026,376 A | 2/2000 | Kenney | |
| 6,034,379 A | 3/2000 | Bunte et al. | |
| 6,075,905 A | 6/2000 | Herman et al. | |
| 6,115,114 A | 9/2000 | Berg et al. | |
| 6,141,293 A | 10/2000 | Amorai-Moriya et al. | |
| 6,304,855 B1 | 10/2001 | Burke | |
| 6,442,507 B1 | 8/2002 | Skidmore et al. | |
| 6,549,825 B2 | 4/2003 | Kurata | |
| 6,580,441 B2 | 6/2003 | Schileru-Key | |
| 6,711,293 B1 | 3/2004 | Lowe | |
| 6,721,723 B1 | 4/2004 | Gibson et al. | |
| 6,721,769 B1 | 4/2004 | Rappaport et al. | |
| 6,836,567 B1 | 12/2004 | Silver et al. | |
| 6,995,762 B1 | 2/2006 | Pavlidis et al. | |
| 7,090,135 B2 | 8/2006 | Patel | |
| 7,137,207 B2 | 11/2006 | Armstrong et al. | |
| 7,245,558 B2 | 7/2007 | Willins et al. | |
| 7,248,754 B2 | 7/2007 | Cato | |
| 7,277,187 B2 | 10/2007 | Smith et al. | |
| 7,373,722 B2 | 5/2008 | Cooper et al. | |
| 7,474,389 B2 | 1/2009 | Greenberg et al. | |
| 7,487,595 B2 | 2/2009 | Armstrong et al. | |
| 7,493,336 B2 | 2/2009 | Noonan | |
| 7,508,794 B2 | 3/2009 | Feather et al. | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,693,757 B2 | 4/2010 | Zimmerman | |
| 7,726,575 B2 | 6/2010 | Wang et al. | |
| 7,751,928 B1 | 7/2010 | Antony et al. | |
| 7,783,383 B2 | 8/2010 | Eliuk et al. | |
| 7,839,531 B2 | 11/2010 | Sugiyama | |
| 7,845,560 B2 | 12/2010 | Emanuel et al. | |
| 7,885,865 B2 | 2/2011 | Benson et al. | |
| 7,925,114 B2 | 4/2011 | Mai et al. | |
| 7,957,998 B2 | 6/2011 | Riley et al. | |
| 7,996,179 B2 | 8/2011 | Lee et al. | |
| 8,009,864 B2 | 8/2011 | Linaker et al. | |
| 8,049,621 B1 | 11/2011 | Egan | |
| 8,091,782 B2 | 1/2012 | Cato et al. | |
| 8,094,902 B2 | 1/2012 | Crandall et al. | |
| 8,094,937 B2 | 1/2012 | Teoh et al. | |
| 8,132,728 B2 | 3/2012 | Dwinell et al. | |
| 8,134,717 B2 | 3/2012 | Pangrazio et al. | |
| 8,189,855 B2 | 5/2012 | Opalach et al. | |
| 8,199,977 B2 | 6/2012 | Krishnaswamy et al. | |
| 8,207,964 B1 | 6/2012 | Meadow et al. | |
| 8,233,055 B2 | 7/2012 | Matsunaga et al. | |
| 8,260,742 B2 | 9/2012 | Cognigni et al. | |
| 8,265,895 B2 | 9/2012 | Willins et al. | |
| 8,277,396 B2 | 10/2012 | Scott et al. | |
| 8,284,988 B2 | 10/2012 | Sones et al. | |
| 8,423,431 B1 | 4/2013 | Rouaix et al. | |
| 8,429,004 B2 | 4/2013 | Hamilton et al. | |
| 8,463,079 B2 | 6/2013 | Ackley et al. | |
| 8,479,996 B2 | 7/2013 | Barkan et al. | |
| 8,520,067 B2 | 8/2013 | Ersue | |
| 8,542,252 B2 | 9/2013 | Perez et al. | |
| 8,571,314 B2 | 10/2013 | Tao et al. | |
| 8,599,303 B2 | 12/2013 | Stettner | |
| 8,630,924 B2 | 1/2014 | Groenevelt et al. | |
| 8,660,338 B2 | 2/2014 | Ma et al. | |
| 8,743,176 B2 | 6/2014 | Stettner et al. | |
| 8,757,479 B2 | 6/2014 | Clark et al. | |
| 8,812,226 B2 | 8/2014 | Zeng | |
| 8,923,893 B2 | 12/2014 | Austin et al. | |
| 8,939,369 B2 | 1/2015 | Olmstead et al. | |
| 8,954,188 B2 | 2/2015 | Sullivan et al. | |
| 8,958,911 B2 | 2/2015 | Wong et al. | |
| 8,971,637 B1 | 3/2015 | Rivard | |
| 8,989,342 B2 | 3/2015 | Liesenfelt et al. | |
| 9,007,601 B2 | 4/2015 | Steffey et al. | |
| 9,037,287 B1 | 5/2015 | Grauberger et al. | |
| 9,064,394 B1 | 6/2015 | Trundle | |
| 9,070,285 B1 | 6/2015 | Ramu et al. | |
| 9,072,929 B1 | 7/2015 | Rush et al. | |
| 9,120,622 B1 | 9/2015 | Elazary et al. | |
| 9,129,277 B2 | 9/2015 | MacIntosh | |
| 9,135,491 B2 | 9/2015 | Morandi et al. | |
| 9,159,047 B2 | 10/2015 | Winkel | |
| 9,171,442 B2 | 10/2015 | Clements | |
| 9,247,211 B2 | 1/2016 | Zhang et al. | |
| 9,329,269 B2 | 5/2016 | Zeng | |
| 9,349,076 B1 | 5/2016 | Liu et al. | |
| 9,367,831 B1 | 6/2016 | Besehanic | |
| 9,380,222 B2 | 6/2016 | Clayton et al. | |
| 9,396,554 B2 | 7/2016 | Williams et al. | |
| 9,400,170 B2 | 7/2016 | Steffey | |
| 9,424,482 B2 | 8/2016 | Patel et al. | |
| 9,517,767 B1 | 12/2016 | Kentley et al. | |
| 9,542,746 B2 | 1/2017 | Wu et al. | |
| 9,549,125 B1 | 1/2017 | Goyal et al. | |
| 9,562,971 B2 | 2/2017 | Shenkar et al. | |
| 9,565,400 B1 | 2/2017 | Curlander et al. | |
| 9,589,353 B2 | 3/2017 | Mueller-Fischer et al. | |
| 9,600,731 B2 | 3/2017 | Yasunaga et al. | |
| 9,600,892 B2 | 3/2017 | Patel et al. | |
| 9,612,123 B1 | 4/2017 | Levinson et al. | |
| 9,639,935 B1 | 5/2017 | Douady-Pleven et al. | |
| 9,697,429 B2 | 7/2017 | Patel et al. | |
| 9,766,074 B2 | 9/2017 | Roumeliotis et al. | |
| 9,778,388 B1 | 10/2017 | Connor | |
| 9,779,205 B2 | 10/2017 | Namir | |
| 9,791,862 B1 | 10/2017 | Connor | |
| 9,805,240 B1 | 10/2017 | Zheng et al. | |
| 9,811,754 B2 | 11/2017 | Schwartz | |
| 9,827,683 B1 | 11/2017 | Hance et al. | |
| 9,880,009 B2 | 1/2018 | Bell | |
| 9,928,708 B2 | 3/2018 | Lin et al. | |
| 9,953,420 B2 | 4/2018 | Wolski et al. | |
| 9,980,009 B2 | 5/2018 | Jiang et al. | |
| 9,994,339 B2 | 6/2018 | Colson et al. | |
| 9,996,818 B1 | 6/2018 | Ren et al. | |
| 10,019,803 B2 | 7/2018 | Venable et al. | |
| 10,111,646 B2 | 10/2018 | Nycz et al. | |
| 10,121,072 B1 | 11/2018 | Kekatpure | |
| 10,127,438 B1 | 11/2018 | Fisher et al. | |
| 10,133,951 B1 | 11/2018 | Mendonca et al. | |
| 10,197,400 B2 | 2/2019 | Jesudason et al. | |
| 10,210,603 B2 | 2/2019 | Venable et al. | |
| 10,229,386 B2 | 3/2019 | Thomas | |
| 10,248,653 B2 | 4/2019 | Blassin et al. | |
| 10,262,294 B1 | 4/2019 | Hahn et al. | |
| 10,265,871 B2 | 4/2019 | Hance et al. | |
| 10,289,990 B2 | 5/2019 | Rizzolo et al. | |
| 10,336,543 B1 | 7/2019 | Sills et al. | |
| 10,349,031 B2 | 7/2019 | Deluca | |
| 10,352,689 B2 | 7/2019 | Brown et al. | |
| 10,373,116 B2 | 8/2019 | Medina et al. | |
| 10,394,244 B2 | 8/2019 | Song et al. | |
| 2001/0031069 A1 | 10/2001 | Kondo et al. | |
| 2001/0041948 A1 | 11/2001 | Ross et al. | |
| 2002/0006231 A1 | 1/2002 | Jayant et al. | |
| 2002/0059202 A1 | 5/2002 | Hadzikadic et al. | |
| 2002/0097439 A1 | 7/2002 | Braica | |
| 2002/0146170 A1 | 10/2002 | Rom | |
| 2002/0158453 A1 | 10/2002 | Levine | |
| 2002/0164236 A1 | 11/2002 | Fukuhara et al. | |
| 2003/0003925 A1 | 1/2003 | Suzuki | |
| 2003/0094494 A1 | 5/2003 | Blanford et al. | |

(56) References Cited

U.S. PATENT DOCUMENTS

| | | |
|---|---|---|
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1 | 8/2011 | Filimonova et al. |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0138534 A1 | 5/2013 | Herwig |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0169681 A1 | 7/2013 | Rasane et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0112537 A1 | 4/2014 | Frank et al. |
| 2014/0129027 A1 | 5/2014 | Schnittman |
| 2014/0156133 A1 | 6/2014 | Cullinane et al. |
| 2014/0161359 A1 | 6/2014 | Magri et al. |

(56) References Cited

U.S. PATENT DOCUMENTS

| | | |
|---|---|---|
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1 | 9/2016 | Wu et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178310 A1 | 6/2017 | Gornish |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1* | 10/2017 | Skaff ................. G05D 1/0246 |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0218218 A1 | 8/2018 | Madan et al. |
| 2018/0251253 A1 | 9/2018 | Taira et al. |
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |

(56) References Cited

U.S. PATENT DOCUMENTS

| | | |
|---|---|---|
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0160675 A1 | 5/2019 | Paschall, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0271984 A1* | 9/2019 | Kingsford ............ B65G 1/0492 |
| 2019/0304132 A1 | 10/2019 | Yoda et al. |
| 2019/0392212 A1 | 12/2019 | Sawhney et al. |
| 2020/0053325 A1 | 2/2020 | Deyle et al. |
| 2020/0314333 A1 | 10/2020 | Liang et al. |

FOREIGN PATENT DOCUMENTS

| | | |
|---|---|---|
| CN | 102214343 | 10/2011 |
| CN | 104200086 | 12/2014 |
| CN | 105989512 | 10/2016 |
| CN | 107067382 | 8/2017 |
| CN | 206952978 | 2/2018 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| EP | 3400113 | 11/2018 |
| FR | 3001567 | 8/2014 |
| GB | 2323238 | 9/1998 |
| GB | 2330265 | 4/1999 |
| JP | 2014170431 | 9/2014 |
| JP | 2016194834 | 11/2016 |
| JP | 2017016539 | 1/2017 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2017175312 | 10/2017 |
| WO | WO 2017187106 | 11/2017 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Façade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

* cited by examiner

METHOD, SYSTEM AND APPARATUS FOR MITIGATING DATA CAPTURE LIGHT LEAKAGE

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets.

A mobile automation apparatus may be deployed within such facilities to perform tasks at various locations. For example, a mobile automation apparatus may be deployed to capture data representing an aisle in a retail facility for use in identifying products that are out of stock, incorrectly located, and the like. The dynamic nature of environments such as the retail facility may complicate data capture. For example, to avoid interfering with customers, staff or the like within the facility, the mobile apparatus may begin data capture inside the aisle. However, this may lead to incomplete capture of the aisle.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
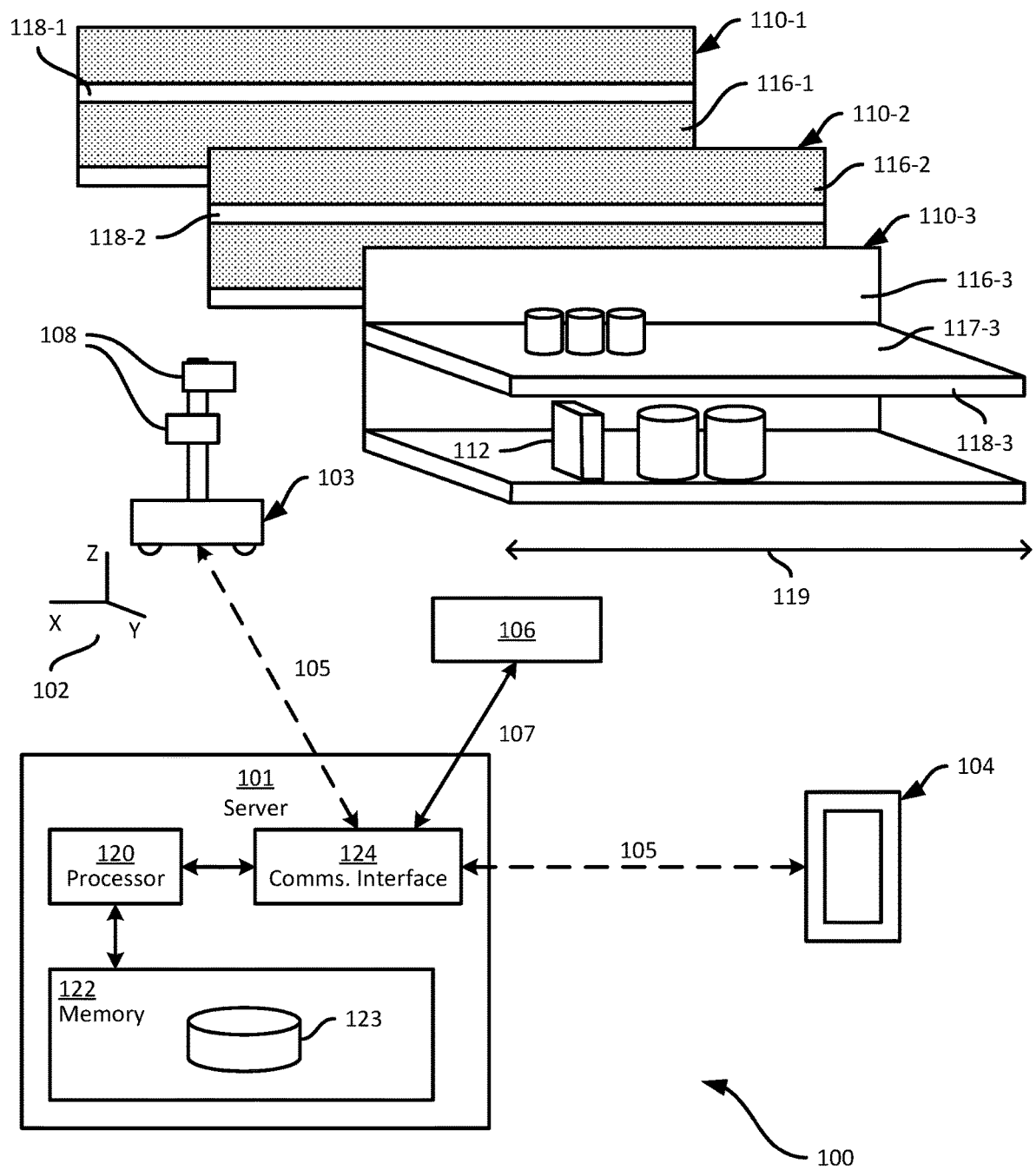
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile automation apparatus including: a chassis supporting a locomotive assembly and an illumination assembly configured to emit light over a field of illumination (FOI); a navigational controller connected to the locomotive assembly and the illumination assembly, the navigational controller configured to: obtain a task definition identifying a region in a facility; generate a data capture path traversing the region from an origin location to a destination location, the data capture path including: (i) an entry segment beginning at the origin location and defining a direction of travel angled away from a support structure in the region such that a lagging edge of the FOI intersects with the support structure; and (ii) an exit segment defining a direction of travel angled towards the support structure and terminating at the destination location such that a leading edge of the FOI intersects with the support structure.

Additional examples disclosed herein are directed to a method in a navigational controller, the method comprising: obtaining a task definition identifying a region in a facility; generating a data capture path for a mobile automation apparatus to traverse the region from an origin location to a destination location, the data capture path including: (i) an entry segment beginning at the origin location and defining a direction of travel angled away from a support structure in the region such that a lagging edge of the FOI intersects with the support structure; and (ii) an exit segment defining a direction of travel angled towards the support structure and terminating at the destination location such that a leading edge of the FOI intersects with the support structure.

Further examples disclosed herein are directed to a non-transitory computer-readable medium storing computer-readable instructions for execution by a navigational controller, wherein execution of the computer-readable instructions configures the navigational controller to: obtain a task definition identifying a region in a facility; generate a data capture path for a mobile automation apparatus to traverse the region from an origin location to a destination location, the data capture path including: (i) an entry segment beginning at the origin location and defining a direction of travel angled away from a support structure in the region such that a lagging edge of the FOI intersects with the support structure; and (ii) an exit segment defining a direction of travel angled towards the support structure and terminating at the destination location such that a leading edge of the FOI intersects with the support structure.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102. The apparatus 103 can navigate the facility by generating paths from origin locations to destination locations. For example, to traverse an aisle while capturing data representing the shelves 110 of that aisle, the apparatus 103 can generate a path that traverses the aisle. As will be discussed in greater detail below, the path generated by the apparatus enables data capture while also mitigating light leakage from an illumination assembly of the apparatus into portions of the facility outside the target aisle, where such light may interfere with customers, another apparatus 103, or the like.

The server 101 includes a special purpose controller, such as a processor 120, specifically designed to control and/or assist the mobile automation apparatus 103 to navigate the environment and to capture data. The processor 120 is interconnected with a non-transitory computer readable storage medium, such as a memory 122, having stored thereon computer readable instructions for performing various functionality, including control of the apparatus 103 to navigate the modules 110 and capture shelf data, as well as post-processing of the shelf data. The memory 122 can also store data for use in the above-mentioned control of the apparatus 103, such as a repository 123 containing a map of the retail environment and any other suitable data (e.g. operational constraints for use in controlling the apparatus 103, data captured by the apparatus 103, and the like).

The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 124 for storage (e.g. in the repository 123) and subsequent processing (e.g. to detect objects such as shelved products in the captured data, and detect status information corresponding to the objects). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
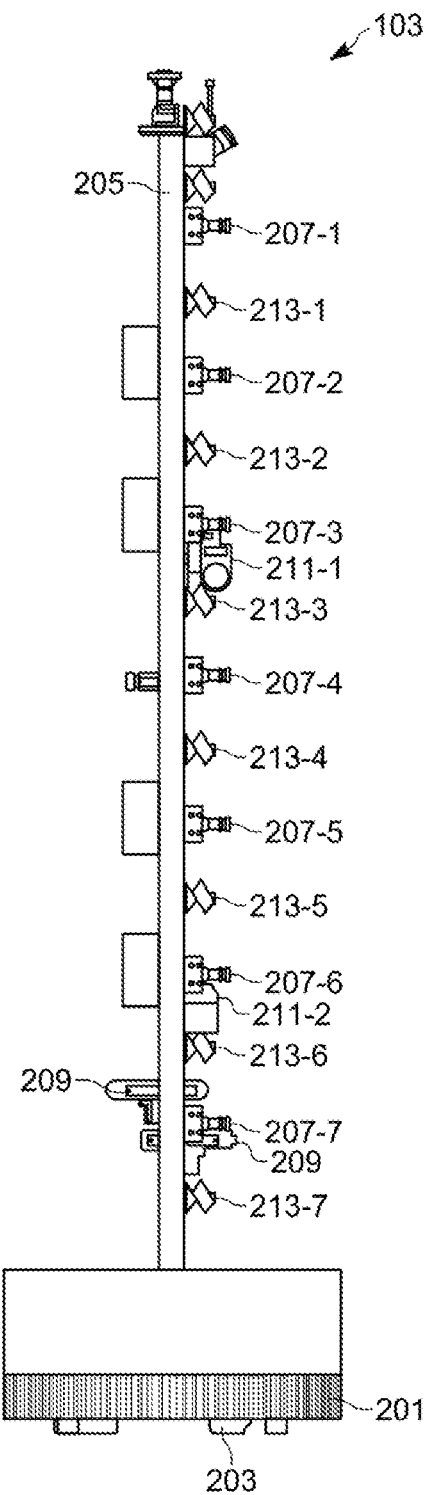
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and lidars 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
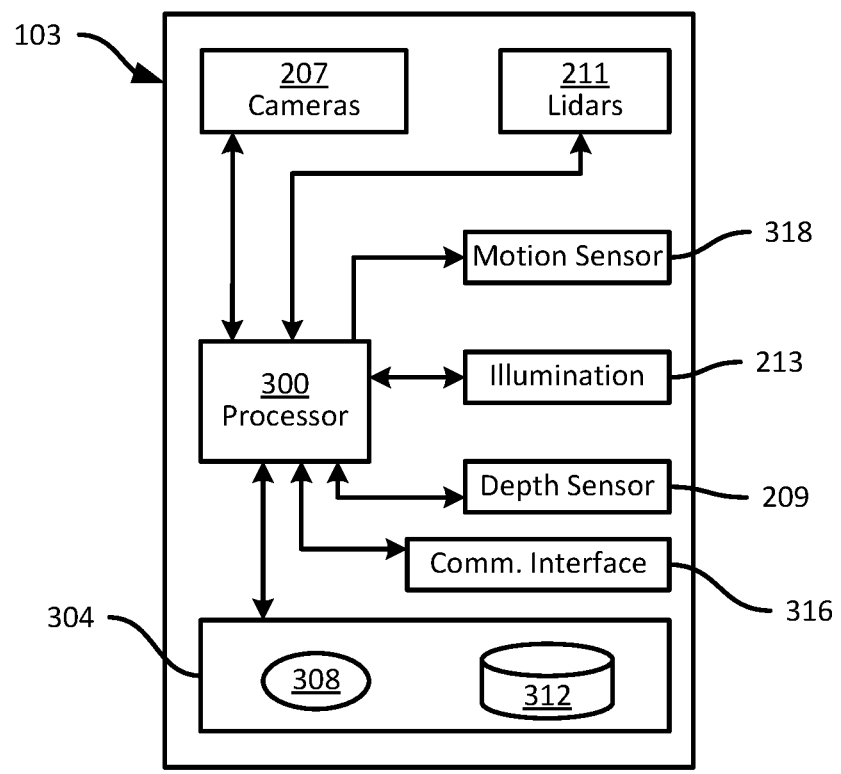
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, lidars 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores a localization application 308 which, when executed by the processor 300, configures the processor 300 to perform various functions related to generating data capture paths that mitigate light leakage from the illumination assemblies outside the target aisle.

The processor 300, when so configured by the execution of the application 308, may also be referred to as a navigational controller 300. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308 (i.e. during the generation of data capture paths). The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

In addition to the sensors mentioned earlier, the apparatus 103 includes a motion sensor 318, such as one or more wheel odometers coupled to the locomotive assembly 203. The motion sensor 318 can also include, in addition to or instead of the above-mentioned wheel odometer(s), an inertial measurement unit (IMU) configured to measure acceleration along a plurality of axes.

Figure 4:
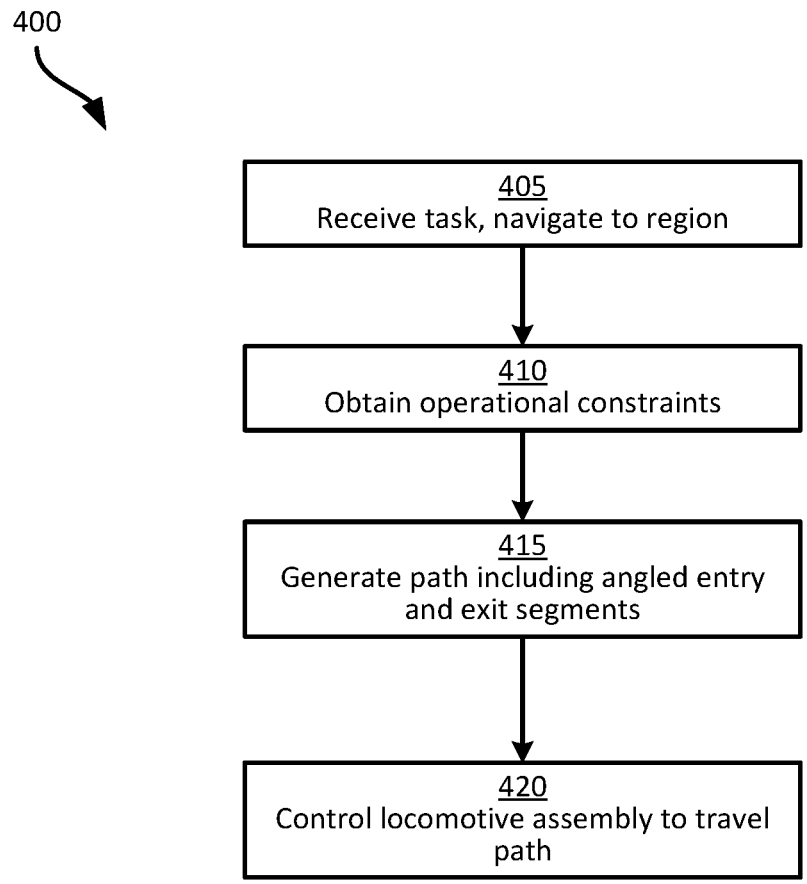
FIG. 4 is a flowchart of a method of mitigating data capture light leakage in the system of FIG. 1.

The actions performed by the apparatus 103, and specifically by the processor 300 as configured via execution of the application 308, to generate data capture paths mitigating illumination leakage will now be discussed in greater detail with reference to FIG. 4. FIG. 4 illustrates a method 400 of mitigating light leakage outside a target aisle from the illumination assemblies 213 during data capture tasks. The method 400 will be described in conjunction with its performance in the system 100, and in particular by the apparatus 103, with reference to the components illustrated in FIGS. 2 and 3. As will be apparent in the discussion below, in other examples, some or all of the processing performed by the server 101 may be performed by the apparatus 103, and some or all of the processing performed by the apparatus 103 may be performed by the server 101.

Beginning at block 405, the apparatus 103 obtains a task definition, for example by receiving the task definition from the server 101 over the link 107. The task definition identifies a region of the facility. In the present example, the region is an aisle composed of a set of contiguous shelf modules 110 (i.e. sub-regions), and the task definition may also identify the individual modules 110. The task definition, in other words, instructs the apparatus 103 to travel to the identified aisle and capture data representing that aisle. Responsive to receiving the task definition, the apparatus 103 navigates to the identified aisle (e.g. to one end of the aisle, specified in the task definition). Navigation to the aisle can be accomplished through the implementation of any of a variety of path planning and navigational algorithms by the apparatus, with or without the assistance of the server 101, as will be understood by those skilled in the art.

To capture the data, the apparatus 103 travels along the aisle (as noted in connection with the length 119 in FIG. 1). During the traverse of the target aisle, the apparatus 103 captures images, depth measurements and the like with the sensors 108 (e.g. the cameras 207 and lidars 211). In addition, the apparatus 103 typically activates the illumination assemblies throughout the traverse of the target aisle, to illuminate the shelf modules 110.

Figure 5:
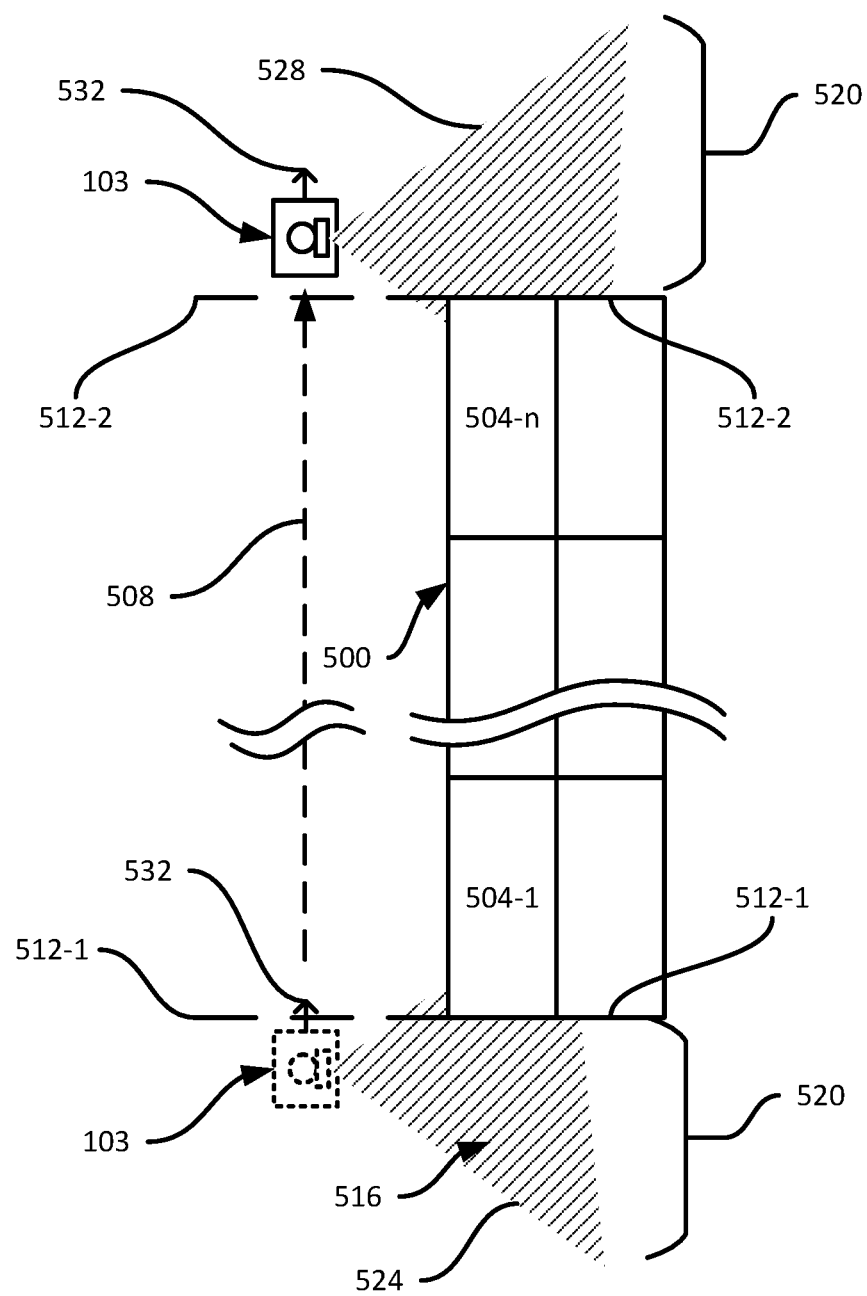
FIG. 5 is a diagram of a data capture path resulting in light leakage beyond the end of an aisle.

Turning to FIG. 5, an example aisle 500 including modules 504-1, . . . , 504-5, which may each have similar structural features to the modules 110 discussed in connection with FIG. 1. In order to capture data representing the modules 504, the apparatus 103 may travel along a path 508 extending from an initial position (in which the apparatus 103 is shown in dashed lines) to a final position (in which the apparatus 103 is shown in solid lines). As seen in FIG. 5, the initial position and the final position are outside the ends 512-1 and 512-2 of the aisle 500 (the extents of which are indicated by dashed lines). As a result, a field of illumination (FOI) 516 of the illumination assemblies 213 extends beyond the ends 512 of the aisle 500, and illuminates areas 520 of the facility that may contain customers, another apparatus 103, or the like. In other words, the edges of the FOI do not intersect with the aisle. Instead, at the initial position, a lagging edge 524 of the FOI 516 does not intersect with the aisle 500, and at the final position a leading edge 528 of the FOI 516 does not intersect with the aisle 500. As will be apparent to those skilled in the art, the edges 524 and 528 of the FOI 516 have fixed angles, e.g. relative to a forward direction 532 of the apparatus 103, as a result of position of the illumination assemblies 213 being fixed on the mast 205.

Returning to FIG. 4, the apparatus 103, via performance of the method 400, generates a path that, in contrast with the path 508 shown in FIG. 5, reduces or eliminates the areas 520 of light leakage. At block 410 the apparatus 103 retrieves operational constraints applying to travel along the aisle identified in the task definition from block 405. Operational constraints include, in the present example, an optimal distance from the shelf modules 110 (or, more specifically, from a plane containing the shelf edges 118, referred to herein as the shelf plane or support structure plane) for data capture. The operational constraints can also include an optimal data capture angle, defined as an angle between the orientation of the apparatus and the shelf plane. Typically, the optimal data capture angle is zero (i.e. such that the apparatus 103 travels parallel to the shelf plane).

The operational constraints can also include minimum and maximum permissible data capture distances, defined relative to the shelf plane, as well as distances from the ends 512 of the aisle 500 at which the data capture path begins and ends (i.e. specifying how far outside the aisle 500 the data capture operation must begin and end). Various other operational constraints may also be retrieved at block 410, such as minimum and/or maximum travel speeds for the apparatus 103, maximum angular changes between poses in the navigational path to be generated as discussed below, and the like.

Figure 6:
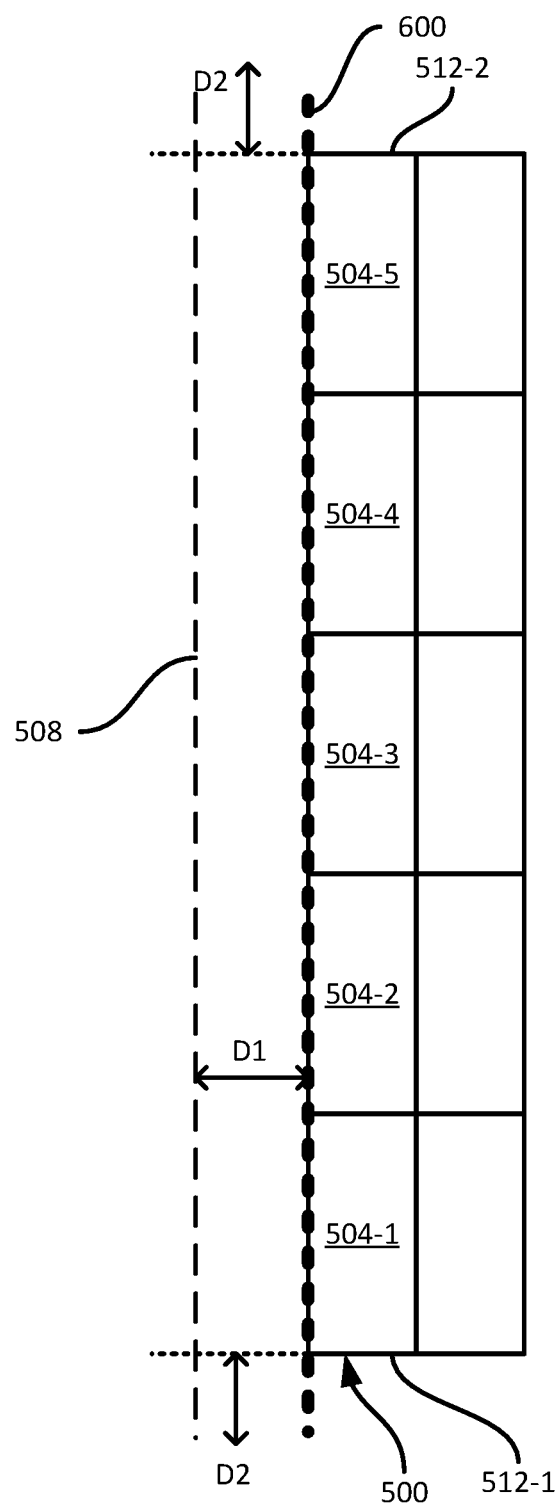
FIG. 6 is a diagram illustrating operational constraints employed during generation of a data capture path in the method of FIG. 4.

Referring to FIG. 6, the aisle 500 is shown in full, including the end modules 504-1 and 504-5 as well as intermediate modules 504-2, 504-3 and 504-4. FIG. 6 also illustrates certain examples of operational constraints retrieved at block 410. For example, FIG. 6 illustrates an optimal distance D1 between a shelf plane 600 and the apparatus 103 for data capture. FIG. 6 also illustrates a distance D2 beyond each end 512 of the aisle at which the path the apparatus 103 travels is to begin and end. Further, it is assumed that the operational constraints include an optimal data capture angle of zero degrees. In other words, according to the operational constraints, the optimal path travelled by the apparatus 103 is the path 508, mentioned earlier, which begins at the distance D2 outside the first end 512-1 of the aisle 500, travels parallel to the shelf plane 600 at a distance D1 from the shelf plane 600, and terminates at a distance D1 outside the second end 512-2 of the aisle 500. As seen in connection with FIG. 5, however, such a path results in illumination leakage beyond the ends of the aisle 500.

Figure 7:
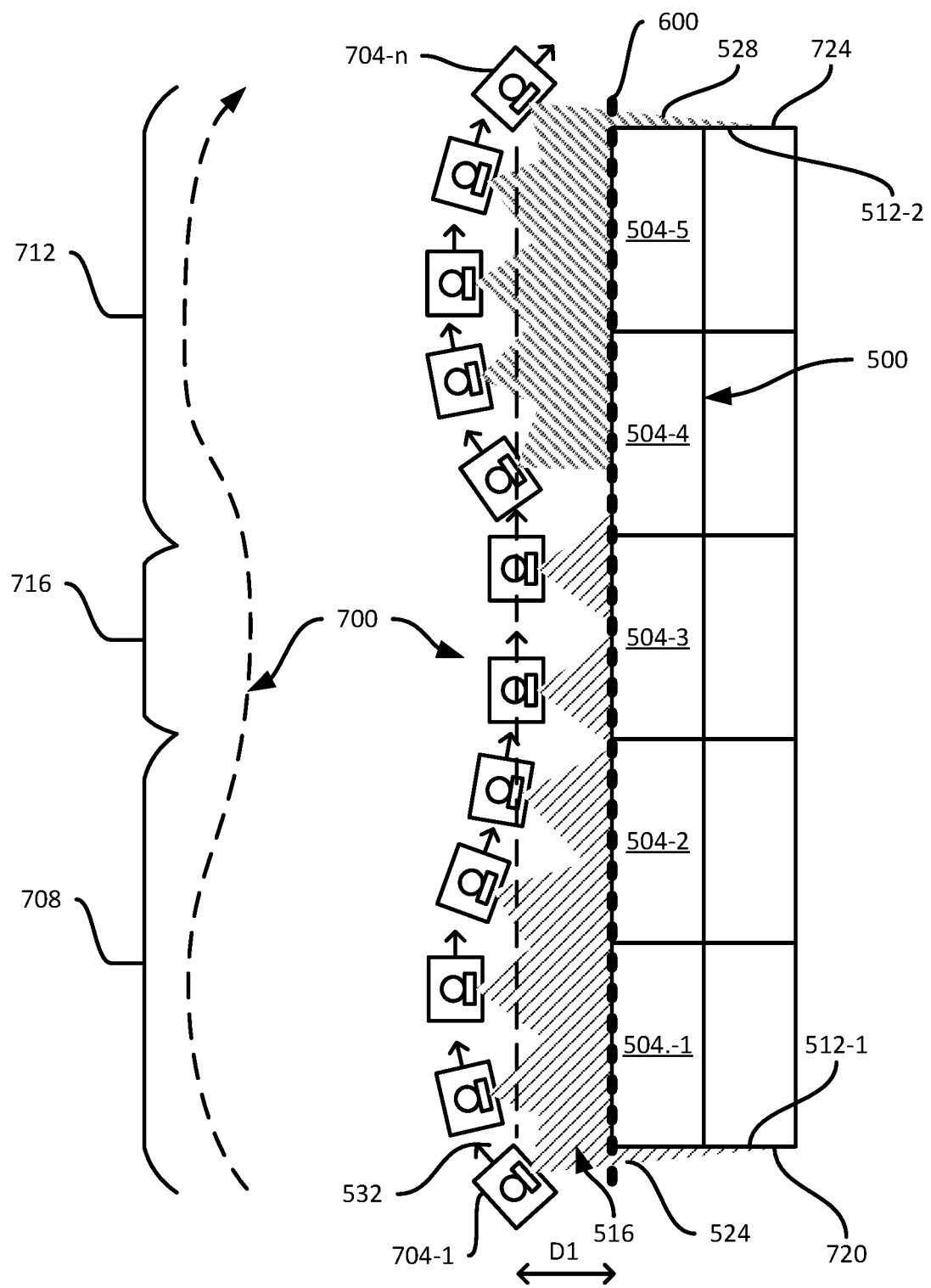
FIG. 7 is a diagram illustrating a data capture path mitigating light leakage according to the method of FIG. 4.

Returning to FIG. 4, at block 415, having retrieved the operational constraints, the apparatus 103 therefore generates a data capture path that includes angled entry and exit segments. An example data capture path 700 is shown in FIG. 7. The path 700 includes a sequence of poses 704-1, . . . , 704-n, each defining a location (e.g. according to the frame of reference 102) and an orientation. The orientation of each pose, in the present example, is defined as an angle between the forward direction 532 of the apparatus 103 and the shelf plane 600.

As seen in FIG. 7, the path 700 includes an entry segment 708 defining a travel direction that is initially angled away from the shelf plane 600, before returning towards the shelf plane 600. The path 700 also includes an exit segment 712 that defines a travel direction that is angled towards the shelf plane 600 as the apparatus approaches the destination location (i.e. the pose 704-n). An initial portion of the exit segment 712 angles away from the shelf plane. As will be apparent in the discussion below, however, in some embodiments the portion of the entry segment angled towards the shelf plane 600 can be omitted, as can the portion of the exit segment angled away from the shelf plane 600.

Additionally, the path 700 includes a main, or central, segment 716 that defines a travel direction substantially parallel to the shelf plane 600. In some embodiments (e.g. depending on the length of the aisle 500) the main segment 716 can be omitted, and the path 700 can consist solely of an entry segment 708 and an exit segment 712. In the illustrated example, the origin location (i.e. the location of the pose 704-1) and the destination (i.e. the location of the pose 704-n) are at the optimal distance D1 from the shelf plane 600. The main segment 716 also places the apparatus 103 at the optimal distance D1 from the shelf plane 600. The outwardly angled (i.e. away from the shelf plane 600) portion of the entry segment guides the apparatus 103 away from the optimal distance, and therefore the entry segment also includes an inwardly angled portion to return to the optimal distance and begin the main segment 716. Likewise, in order to travel angled towards the shelf plane 600 and arrive at the destination pose 704-n, the apparatus 103 is required to depart from the optimal distance, and the exit segment 712 therefore includes an outwardly angled portion immediately following the main segment 716.

As is evident from FIG. 7, the lagging edge 524 of the FOI 516 intersects the aisle boundary (in particular, the end 512-1 of the aisle) at a point 720 when the apparatus 103 is at the pose 704-1. The lagging edge 524 of the FOI 516 for subsequent poses in the entry segment 708 also intersects with the aisle 500 at various other points. In other words, the outward angles of the poses of the entry segment mitigate or eliminate light leakage outside the aisle during execution of the path 700. Similarly, at the destination pose 704-n the leading edge 528 of the FOI 516 intersects the aisle boundary at a point 724 on the second end 512-2 of the aisle 500.

Figure 8:
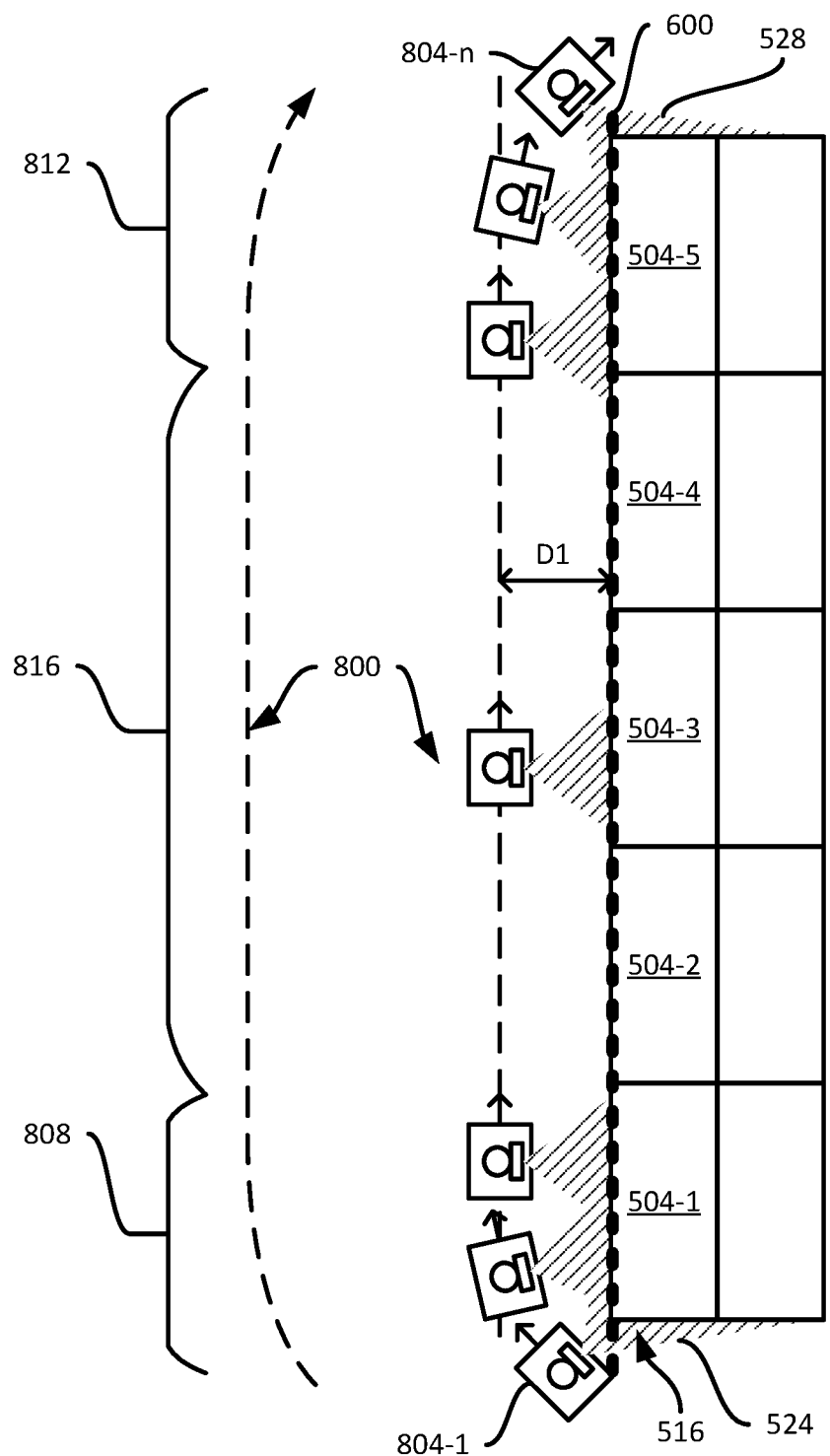
FIG. 8 is a diagram illustrating another data capture path mitigating light leakage according to the method of FIG. 4.

As noted above, in other embodiments the entry and exit segments define only travel directions angled away from and towards, respectively, the shelf plane 600. That is, the inwardly-angled portion of the entry segment and the outwardly-angled portion of the exit segment can be omitted. Turning to FIG. 8, an example path 800 is illustrated, including an entry segment 808, an exit segment 812, and a main segment 816. The entry and exit segments 808 and 812, as seen in FIG. 8, are outwardly angled and inwardly angled, respectively. The entry segment 808 begins (at an origin pose 804-1) closer to the shelf plane 600 than the optimal distance, and therefore terminates at the optimal distance without the need to return towards the shelf plane 600. The exit segment 812 therefore begins (at the end of the main segment 816) at the optimal distance, and simply angles inwards towards the shelf plane, to terminate at the destination pose 804-n. As also seen in FIG. 8, the path 800 results in the lagging edge 524 intersecting with a boundary of the aisle 500 (specifically, the end Various other configurations of paths will now occur to those skilled in the art. The apparatus 103 can implement any of a variety of suitable path generation mechanisms for generating the poses 704 and 804 of the paths 700 and 800. During such path generation, the apparatus 103 may apply an additional orientation constraint beyond those noted earlier, such as minimum and maximum permissible data capture distances and the like. The constraint applied to the orientation of each pose in the entry segment (e.g. 708, 808)

and exit segment (e.g. 712, 812) defines a threshold beyond which light leakage outside the aisle 500 may occur. Determination of the above-mentioned constraint may be performed as discussed below, in connection with FIGS. 9 and 10.

Figure 9:
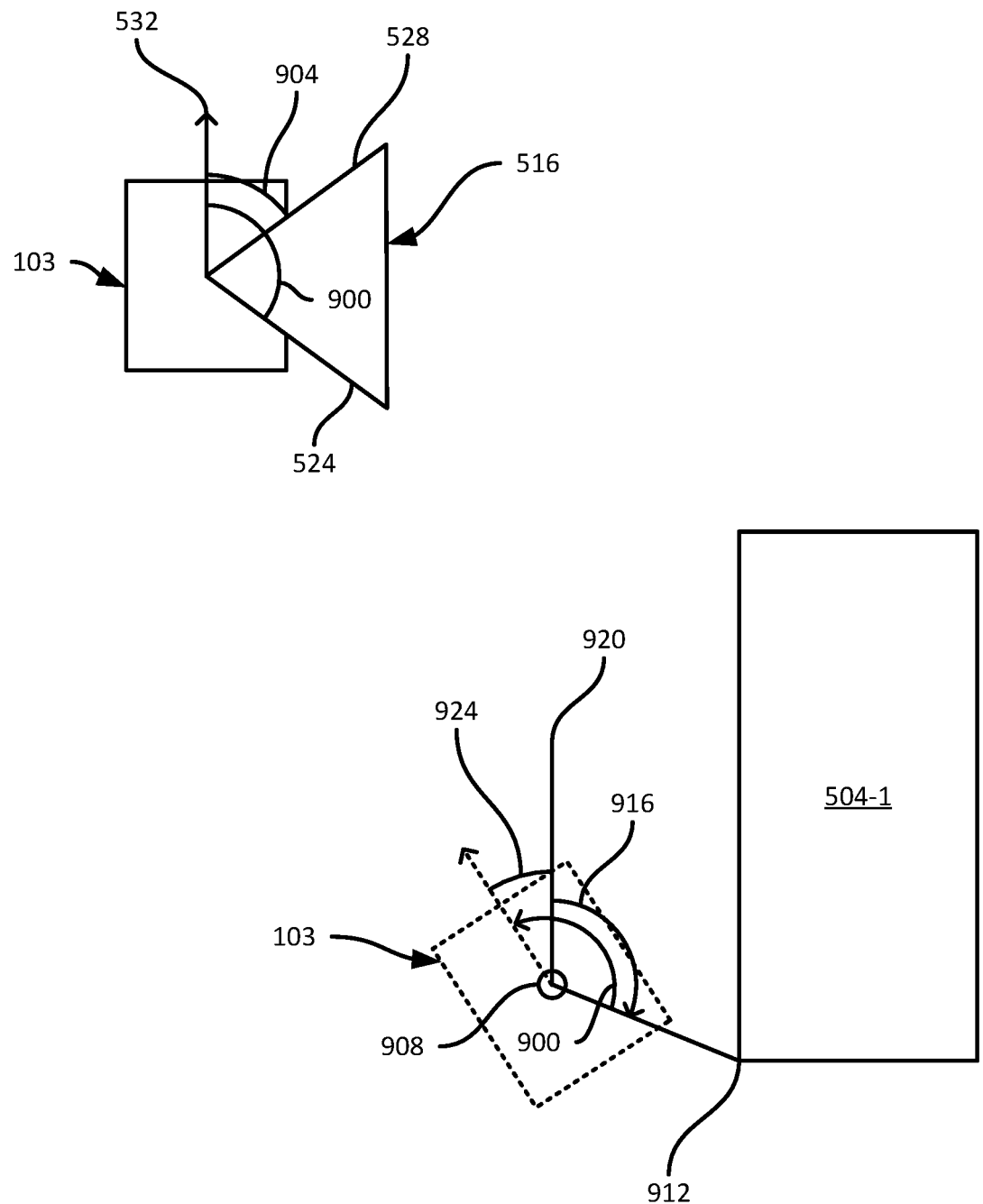
FIG. 9 is a diagram illustrating a determination of a minimum orientation for the apparatus of FIG. 1 in an entry segment generated in the method of FIG. 4.

FIG. 9 illustrates the apparatus 103 along with the FOI 516 (including the edges 524 and 528 noted above). An angle 900 between the forward direction 532 and the lagging edge 524 is stored in the memory 304, as is an angle 904 between the forward direction 532 and the leading edge 528.

FIG. 9 also illustrates the module 504-1 of the aisle 500, and a location 908 of a pose to be generated for a data capture path. To determine a minimum orientation required to prevent light leakage during an entry segment of the path, the apparatus 103 identifies a lagging aisle boundary 912, defined as the furthest extent of the aisle 500 that is visible from the pose location 908 in the lagging direction (i.e. further from the destination of the path than any other portion of the aisle 500 visible from the pose location 908). The boundary may be detected, for example, from the map stored in the repository 312, based on the pose location 908. For example, the apparatus 103 can identify the boundary 912 (and other boundaries mentioned herein) by determining each point on the module 504-1 to which the pose location 908 has line-of-sight, and selecting the point at the greatest distance from the pose location 908.

The lagging boundary 912, in the present example, is a corner of the module 504-1. Based on an angle 916 between the shelf plane 600 (or more specifically, a plane 920 parallel to the shelf plane 600) and the boundary 912, and on the angle 900 mentioned above, a minimum orientation 924 can be determined. That is, the apparatus 103 can assign, e.g. based on other constraints such as the optimal distance and the like, any orientation for the pose location 908 that does not fall below (i.e. closer to the plane 920) the minimum orientation 924.

Figure 10:
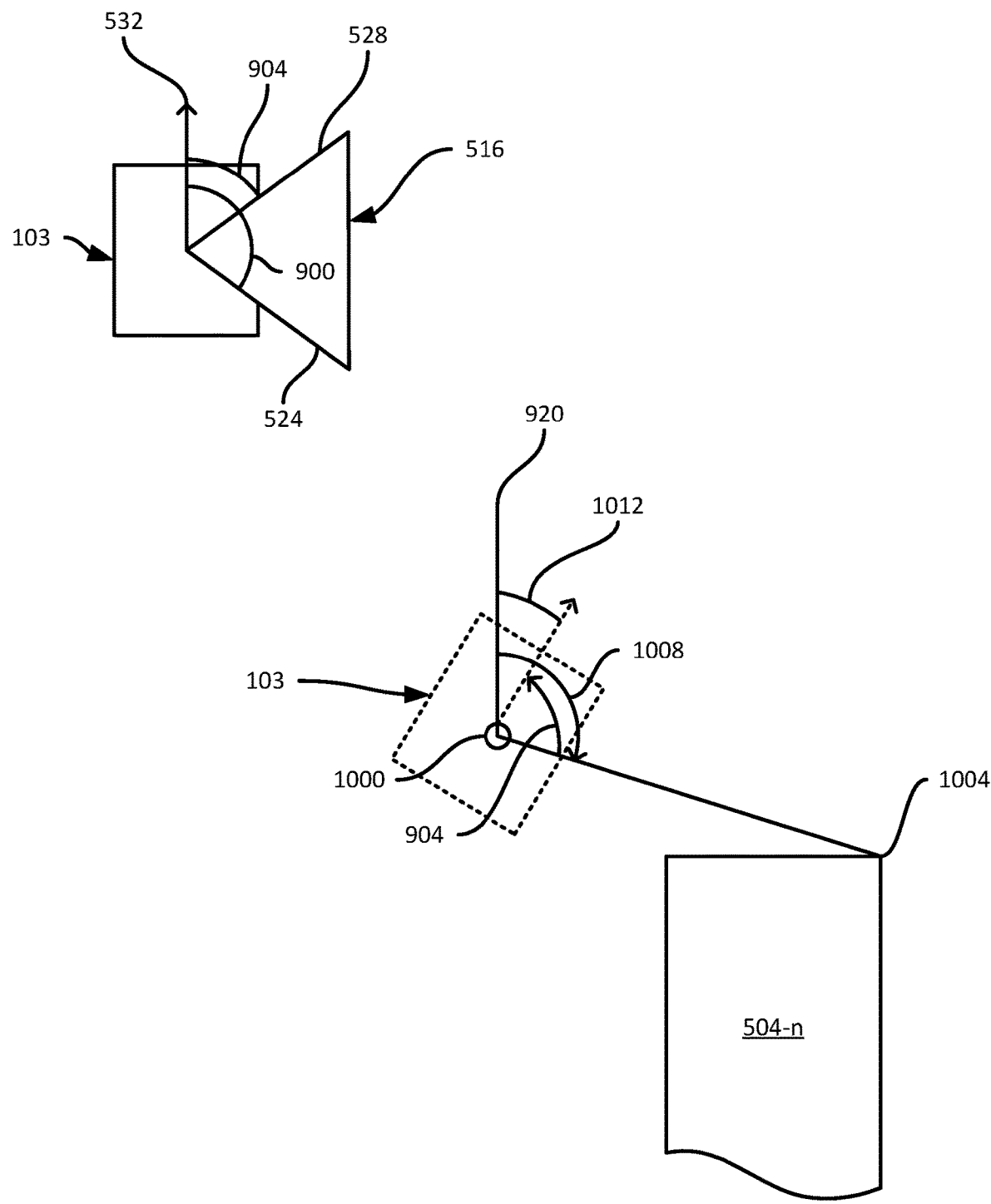
FIG. 10 is a diagram illustrating a determination of a maximum orientation for the apparatus of FIG. 1 in an exit segment generated in the method of FIG. 4.

FIG. 10 illustrates the determination of a maximum orientation for a pose 1000 relative to the module 504-n. In particular, the apparatus 103 identifies a leading boundary 1004 of the aisle 500 (in this case, a corner of the module 504-n), and determines an angle 1008 between the plane 920 and the leading boundary 1004. The leading boundary 1004, in contrast to the lagging boundary discussed above, is a point on the aisle 500 visible from the pose location 1000 that is closer to the destination of the path than any other visible point on the aisle 500.

Based on the angle 1008 and the known angle 904 of the leading edge 528 of the FOI, the apparatus 103 determines a maximum orientation 1012 for the pose location 1000. That is, to prevent light leakage beyond the boundary 1004, the orientation of the apparatus 103 at the pose location 1000 must remain below (i.e. inclined towards the shelf plane 600) the orientation 1012.

Referring briefly again to FIG. 4, at block 420 the processor 300 controls the apparatus 103 (e.g. the locomotive assembly 203) to travel along the path generated at block 415. During traversal of the aisle 500, the processor 300 also controls the illumination assemblies 213 to illuminate the aisle 500, and one or more of the data capture sensors (e.g. the cameras 207 and lidars 211) to capture images, depth measurements and the like representing the aisle 500.

Variations to the above systems and methods are contemplated. For example, in some embodiments, entry and exit path segments can be predefined and stored in the memory 304. The apparatus 103 can then, at block 415, retrieve the entry and exit path segments from the memory 304 rather than generating the segments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile automation apparatus, comprising:
a chassis supporting (i) a locomotive assembly, (ii) a data capture sensor facing outward from a first side of the chassis, and (iii) an illumination assembly configured to emit light over a field of illumination (FOI) facing outward from the first side of the chassis;
a navigational controller connected to the locomotive assembly and the illumination assembly, the navigational controller configured to:
obtain a task definition identifying a region in a facility, the region containing a support structure;
generate a data capture path traversing the region from an origin location to a destination location, the data capture path including:
(i) an entry segment beginning at the origin location and defining a first direction of travel configured to position the support structure on the first side of the chassis and to angle the chassis away from the support structure such that a lagging edge of the FOI intersects with the support structure; and
(ii) an exit segment defining a second direction of travel configured to position the support structure on the first side of the chassis and to angle the chassis towards the support structure, the exit segment terminating at the destination location such that a leading edge of the FOI intersects with the support structure.

2. The mobile automation apparatus of claim 1, wherein the navigational controller is further configured to control the locomotive assembly to traverse the region according to the data capture path.

3. The mobile automation apparatus of claim 2, wherein the navigational controller is further configured, while traversing the region according to the data capture path, to:
(i) control the illumination assembly to illuminate the support structure, and (ii) control the data capture sensor to capture data representing the support structure.

4. The mobile automation apparatus of claim 1, wherein the navigational controller is further configured to generate the data capture path including the entry segment, the exit segment and a main segment between the entry segment and the exit segment.

5. The mobile automation apparatus of claim 4, wherein the main segment defines a third direction of travel parallel to the support structure.

6. The mobile automation apparatus of claim 1, wherein the entry segment includes a sequence of poses, and wherein the navigational controller is further configured, in order to generate each pose of the entry segment, to:
determine a pose location for the pose; and
identify a lagging support structure boundary based on the pose location.

7. The mobile automation apparatus of claim 6, wherein the navigational controller is further configured, in order to generate each pose of the entry segment, to:
determine a minimum orientation relative to a support structure plane based on (i) an angle of the lagging edge of the FOI and (ii) an angle between the support structure plane and the lagging support structure boundary.

8. The mobile automation apparatus of claim 1, wherein the exit segment includes a sequence of poses, and wherein the navigational controller is further configured, in order to generate each pose of the exit segment, to:
determine a pose location for the pose; and
identify a leading support structure boundary based on the pose location.

9. The mobile automation apparatus of claim 8, wherein the navigational controller is further configured, in order to generate each pose of the exit segment, to:
determine a maximum orientation relative to a support structure plane based on (i) an angle of the leading edge of the FOI and (ii) an angle between the support structure plane and the leading support structure boundary.

10. A method in a navigational controller, the method comprising:
obtaining a task definition identifying a region in a facility, the region containing a support structure;
generating a data capture path for a mobile automation apparatus to traverse the region from an origin location to a destination location, the mobile automation apparatus including a chassis supporting (i) a locomotive assembly, (ii) a data capture sensor facing outward from a first side of the chassis, and (iii) an illumination assembly configured to emit light over a field of illumination (FOI) facing outward from the first side of the chassis;
wherein generating the data capture path includes generating:
(i) an entry segment beginning at the origin location and defining a first direction of travel configured to position the support structure on the first side of the chassis and to angle the chassis away from the support structure in the region such that a lagging edge of the FOI intersects with the support structure; and
(ii) an exit segment defining a second direction of travel configured to position the support structure on the first side of the chassis and to angle the chassis towards the support structure, the exit segment terminating at the destination location such that a leading edge of the FOI intersects with the support structure.

11. The method of claim 10, further comprising: controlling a locomotive assembly of the mobile automation apparatus to traverse the region according to the data capture path.

12. The method of claim 11, further comprising, while traversing the region according to the data capture path:
controlling an illumination assembly of the mobile automation apparatus to illuminate the support structure; and
controlling a data capture sensor of the mobile automation apparatus to capture data representing the support structure.

13. The method of claim 10, wherein generating the data capture path comprises generating the data capture path including the entry segment, the exit segment and a main segment between the entry segment and the exit segment.

14. The method of claim 13, wherein the main segment defines a third direction of travel parallel to the support structure.

15. The method of claim 10, wherein the entry segment includes a sequence of poses, and wherein generating each pose of the entry segment comprises:
determining a pose location for the pose; and
identifying a lagging support structure boundary based on the pose location.

16. The method of claim 15, wherein generating each pose of the entry segment further comprises determining a minimum orientation relative to a support structure plane based on (i) an angle of the lagging edge of the FOI and (ii) an angle between the support structure plane and the lagging support structure boundary.

17. The method of claim 10, wherein the exit segment includes a sequence of poses, and wherein generating each pose of the exit segment comprises:
determining a pose location for the pose; and
identifying a leading support structure boundary based on the pose location.

18. The method of claim 17, wherein generating each pose of the exit segment further comprises determining a maximum orientation relative to a support structure plane based on (i) an angle of the leading edge of the FOI and (ii) an angle between the support structure plane and the leading support structure boundary.

19. A non-transitory computer-readable medium storing computer-readable instructions for execution by a navigational controller, wherein execution of the computer-readable instructions configures the navigational controller to:
obtain a task definition identifying a region in a facility;
generate a data capture path for a mobile automation apparatus to traverse the region from an origin location to a destination location, the mobile automation apparatus including a chassis supporting (i) a locomotive assembly, (ii) a data capture sensor facing outward from a first side of the chassis, and (iii) an illumination assembly configured to emit light over a field of illumination (FOI) facing outward from the first side of the chassis;
wherein generation of the data capture path includes generation of:
(i) an entry segment beginning at the origin location and defining a first direction of travel configured to position the support structure on the first side of the chassis and to angle the chassis away from the support structure in the region such that a lagging edge of the FOI intersects with the support structure; and
(ii) an exit segment defining a second direction of travel configured to position the support structure on the first side of the chassis and to angle the chassis towards the support structure, the exit segment terminating at the destination location such that a leading edge of the FOI intersects with the support structure.

* * * * *